E. W. GRAGERT.
CAR AXLE JOURNAL BOX WITH INDEPENDENT SUPPORTING AND PULLING ROLLERS.
APPLICATION FILED SEPT. 16, 1912.
1,074,172.
Patented Sept. 30, 1913.
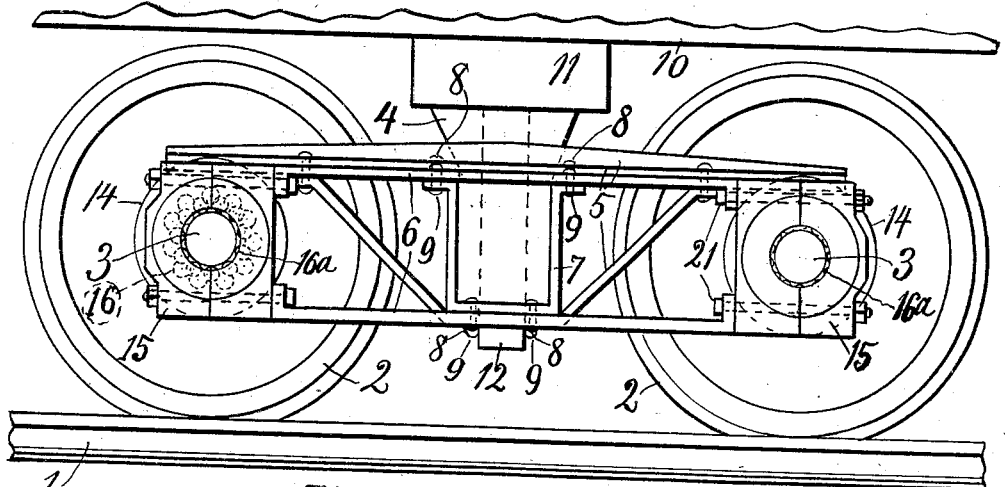
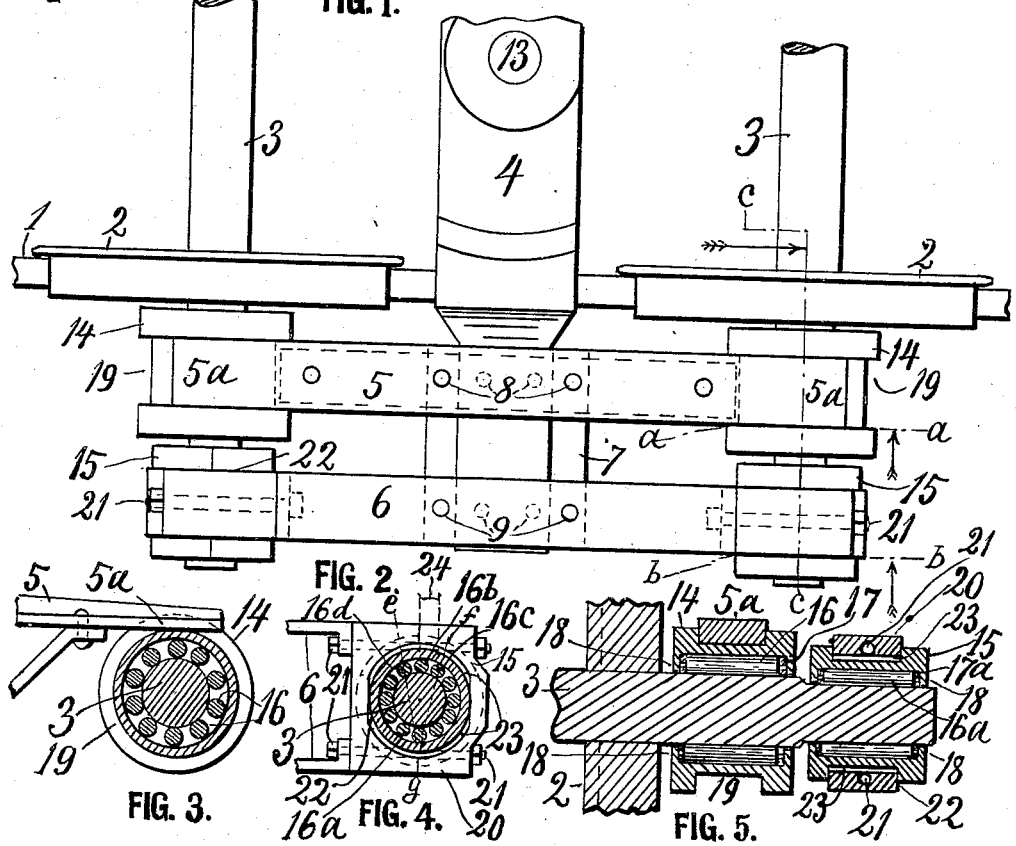
WITNESSES:
A. E. Carlsen
E. C. Carlsen
INVENTOR:
Elmer W. Gragert
BY his ATTORNEY:
A. M. Carlsen

UNITED STATES PATENT OFFICE.

ELMER W. GRAGERT, OF MINNEAPOLIS, MINNESOTA.

CAR-AXLE JOURNAL-BOX WITH INDEPENDENT SUPPORTING AND PULLING ROLLERS.

1,074,172.  Specification of Letters Patent.  Patented Sept. 30, 1913.

Application filed September 16, 1912. Serial No. 720,711.

*To all whom it may concern:*

Be it known that I, ELMER W. GRAGERT, a citizen of the United States, residing at Minneapolis, in the county of Hennepin and State of Minnesota, have invented a new and useful Car-Axle Journal-Box with Independent Supporting and Pulling Rollers, of which the following is a specification.

My invention relates to journal boxes for railway cars, and the principal object is to provide axle journals and journal boxes which will in the greatest possible degree obviate the usual wasting of motive power caused by having the weight of the car and its load resist the rotation of the journal.

Another object is to make roller bearings applicable and of advantage to car axles. These and other objects I attain by the novel construction and arrangement of parts illustrated in the accompanying drawing, in which,—

Figure 1 is a side elevation of a car truck standing on rails and supporting a portion of a railway car, the usual supporting springs are not shown as they are of well known construction, and the truck frame is shown only so far as necessary to explain the invention. Fig. 2 is a top or plan view of one half of the truck shown in Fig. 1, with the car body removed. Fig. 3 is a section on the line $a$—$a$ Fig. 2. Fig. 4 is a section on the line $b$—$b$ Fig. 2, and Fig. 5 is a section on the line $c$—$c$ Fig. 2.

Referring to the drawing by reference numerals, 1 designates rails upon which are shown regular car wheels 2 fixed on axles 3 which extend across the truck in the usual manner and are each at both ends provided with supporting wheels like those shown and marked 2, but it is considered unnecessary to show all the four wheels of the truck. The truck frame is composed of the bolster 4 and the side members 5 fixed at each end of it by U-shaped bolster guides like 7, which are fixed by rivets 8 to the member 5 and by rivets 9 to the member 6. The car body 10 has its bottom provided with the usual bolsters 11, each of which has a central downward king-bolt 12 adapted to descend into the aperture 13 (shown in Fig. 2) in the middle of the bolster 4.

Each end of each axle is journaled in two roller bearings, of which the bearing 14 nearest to the car wheel is shown as being slightly larger than the bearing 15 which is nearest the end of the axle. Either bearing is composed of an internally and externally cylindrical shell, 14 or 15, rollers 16 or 16$^a$ housed therein and having their ends journaled in rings 17 which are by said rollers held clear both of the axle journal and the casing surrounding the rollers; it will also be seen that the casings are formed with the usual flanges 18 to prevent endwise movement of the rollers.

Each casing 14 is provided with an annular groove 19 in which a horizontal arm 5$^a$ of the truck frame member 5 rests and thus supports the car body and its load independently of the means that draws the car. And the truck frame member 6 is at each end provided with a yoke 20, which being made in halves and secured together by bolts 21 is fitted in an annular groove 22 of the shell 15. Said yoke fits snugly against the front and rear sides of the shell, while in vertical direction it is elongated so as to form clearings 23 for the casing to move in. This is to prevent the weight of the car from ever resting on the rollers 16$^a$ as these rollers are used exclusively for propelling the car wheels forward when motive power is imparted to the car body, while, as already stated, the rollers 16 do no pulling but serve only to support the weight of the car and its load.

The advantage gained by this construction should be fully understood from the following explanation: If we suppose the truck portion 6 in Fig. 4 to both support the car and pull forward the axle by means of the single roller bearing shown in said view, the clearing 23 we will say being omitted, it will then follow that according to the well known law of rectilinear forces the vertical line, in which the weight of the truck, the car and its load act, and the horizontal line of the pulling force combine into an inclined line as $e$—$g$, or $e$—$f$ if the pull is in the reverse direction; the exact angle of the inclined line depending on the proportion between the original forces the amount of friction &c. ordinarily the downward pressure by the weight of the car and the load is greater than the horizontally acting pressure required to move the car, hence the line $f$—$g$ for instance may incline only about 15 degrees from a vertical central line through the axle, but even that limited incline causes the weight of the car in a mechanical sense to shift over from the roller 16$^b$ to the roller 16ᶜ (or to 16ᵈ if the pulling force acts in the opposite direction); the great downward pressure of the car is thus moved a distance equal to the line 24 over upon one side of the axle, and as the line 24 will in a full sized railway truck be about two inches, it will be seen that the entire weight of the car and its load act upon a lever two inches long to resist rotation of the axle. Of course if the loaded car has eight wheels and weighs say 80,000 pounds it will mean eight two-inch levers with ten thousand pounds resisting each of them, but the sum is the same, namely 80,000 pounds resisting by a two inch lever the rotation of the car axles. It is this great wasting of motive power I avoid by employing separate roller bearings for supporting and for moving the car.

It should also be understood that although the bottom of the groove 19 is cylindrical, as best shown in Fig. 3, it does not indicate that the journal box rotates but simply that it may rotate slightly if pulling stress should by jerks or jolts tend to give it a pulling or pushing motion, and to avoid sliding friction of the arm 5ᵃ upon the box. If said arm be provided with a roller, the journal box may have a flat top surface, but this would be a more expensive construction and would also prevent sufficient rotation of the journal box to prevent its inner surface from wearing oblong by the weight of the car pressing always the upper side downward upon the rollers.

What I claim is:—

1. The combination with a carrying axle and supporting wheels fixed on the same, of roller bearings embracing the axle, one of said roller bearings supporting the load carried by the axle, and the other roller bearing acting on the axle to actuate it and the wheels and the load in horizontal directions.

2. The combination with carrier wheels, of an axle fixed therein, a truck supported by the axle and adapted to carry a load and to move the axle and wheels, of roller bearings carried by the truck and comprising a journal box rollers engaging the axle exclusively for supporting the truck, and other rollers engaging the axle exclusively for moving it forward or backward in horizontal directions, each of said rollers when in action having one side in contact with the axle and its opposite side in rolling contact with the inner side of the journal box.

In testimony whereof I affix my signature, in presence of two witnesses.

ELMER W. GRAGERT.

Witnesses:
A. M. CARLSEN,
E. C. CARLSEN.

---

Copies of this patent may be obtained for five cents each, by addressing the "Commissioner of Patents, Washington, D. C."